United States Patent [19]

Ulrich

[11] Patent Number: 4,788,879

[45] Date of Patent: Dec. 6, 1988

[54] APPARATUS FOR HAND OPERATION OF THROTTLE AND BRAKE PEDAL, AND METHODS OF CONSTRUCTING AND UTILIZING SAME

[76] Inventor: Dana L. Ulrich, 991 SE. Brookedge Ave., Port St. Lucie, Fla. 33452

[21] Appl. No.: 97,731

[22] Filed: Sep. 17, 1987

[51] Int. Cl.$^4$ ............... G05G 11/00; B60K 41/20
[52] U.S. Cl. .................... 74/481; 24/306; 74/482; 74/525; 180/320; 192/1.52; 403/108; 403/122; 403/379
[58] Field of Search .............. 74/481, 482, 525; 180/320; 24/306, 442; 403/69, 70, 71, 108, 122, 378, 379; 192/3 R, 35, 1.52

[56] References Cited

U.S. PATENT DOCUMENTS

| | | | |
|---|---|---|---|
| 2,135,323 | 11/1938 | Brantingson | 403/379 X |
| 2,481,966 | 9/1949 | Zivi | 74/481 |
| 2,484,401 | 10/1949 | Coie | 403/108 X |
| 2,602,348 | 7/1952 | Wilson | 74/482 X |
| 2,724,285 | 11/1955 | Lerman | 192/3 SX |
| 2,777,335 | 1/1957 | Engberg et al. | 192/3 S |
| 2,854,266 | 9/1958 | Dies | 403/122 |
| 2,855,797 | 10/1958 | Dunn, Jr. | 192/3 S X |
| 2,960,885 | 11/1960 | Donaldson | 74/482 |
| 3,065,647 | 11/1962 | Whitmore | 74/481 |
| 3,226,997 | 1/1966 | Malloy | 74/482 |
| 3,279,008 | 10/1966 | Wallach | 24/306 X |
| 3,342,273 | 9/1967 | Crane | 403/379 X |
| 3,495,796 | 2/1970 | Fruh | 403/108 X |
| 4,324,309 | 4/1982 | Ginley | 180/320 X |
| 4,424,723 | 1/1984 | Gockel | 74/482 |

FOREIGN PATENT DOCUMENTS

| | | | |
|---|---|---|---|
| 275595 | 5/1964 | Australia | 403/379 |
| 1148656 | 4/1969 | United Kingdom | 403/379 |

Primary Examiner—Allan D. Herrmann

[57] ABSTRACT

The present invention discloses an apparatus for hand operation of throttle and brake pedals including two (2) adjustable length rods having handles on one end and throttle and brake pedal engagement devices on the other ends, said rods are held together by an anchor bracket in close proximity, such that, the user of the apparatus can manipulate the brake and the throttle pedals with one hand.

7 Claims, 1 Drawing Sheet

APPARATUS FOR HAND OPERATION OF THROTTLE AND BRAKE PEDAL, AND METHODS OF CONSTRUCTING AND UTILIZING SAME

BACKGROUND OF THE INVENTION

1. Field of the Invention

The present invention relates generally to devices for operating the brake and throttle pedals of a conventional automobile by means other than with the user's feet. Specifically, the present invention is an apparatus which allows the user to control the brake and throttle pedals of a conventional automobile with one of his hands.

Previously, the apparatus for those either temporarily or permanently handicapped in their lower extremities for operating a motor vehicle with their hands involved a great deal of conversion of the automobile. This was usually done at great expense and effort. Furthermore, previously known apparatus for hand operation of brake and throttle pedals were not transferable, at least not easily, amongst vehicles. Additionally, often the prior known apparatus rendered the automobile unusable to those who wished to operate it with their feet. Thus, the principal problems with the earlier apparatus for converting a conventional automobile into one having hand operated throttle and brake pedals were excessive cost, transference problems from one vehicle to another, the apparatus could not be easily transported, it would often render the vehicle unusable for others who were not handicapped, and complicated installation and removal.

The present invention solves all the above-mentioned problems by providing a simple light weight apparatus which is inexpensive to produce and may be removed from the car with simple tools or merely by hand, and because of its light weight construction is easily transportable and transferable amongst vehicles, thereby solving all of the above outlined problems.

2. Description of Relevant Art

The United States Patents which are related to applicant's invention include: U.S. Pat. No. 2,602,348 which teaches a hand control for automotive vehicles which is fixedly attached to the throttle and brake pedals of the automobile and which is not easily installed nor removed and hence it is not transportable; U.S. Pat. No. 2,724,285 which teaches an apparatus for operating the pedal controls of an automobile which discloses an apparatus which is fixedly attached to the brake and throttle pedals of an automobile in such a way that it is not easily installable nor transferable and will encumber the automobiles operation by those who would wish to operate said pedals with their feet; U.S. Pat. No. 2,777,335 which teaches a hand apparatus for controlling brakes and accelerators which will not interfere with the normal operation of the foot pedals of an automobile and while being readily adaptable to different vehicles it is not easily installed or removed and hence it is not portable; and U.S. Pat. No. 2,855,797 whcih shows an automobile drive control which employs a single horizontal handle bar pivotally attached to two vertical cross control rods which are fixedly attached to the brake and throttle pedals of an automobile in a permanent manner and said handle bar is attached to the steering column of the automobile in a fixed manner such that said apparatus is not easily installed nor removed from an automobile thus rendering it non-transportable.

It may easily be concluded that the above-identified references do not disclose an apparatus for hand operation of throttle and brake pedals having the features of: inexpensiveness, easy hand installation or removal, transportability, and adaptability such that the controls may be used on all conventional automobiles.

SUMMARY OF THE INVENTION

Applicant's apparatus for hand operation of throttle and brake pedals on a conventional automobile includes a first handle; a first brake rod having upper and lower ends having said handle fixedly attached to the upper end; a second brake rod having upper and lower ends telescopingly engaged with said lower end of said first brake rod; first means, operably engaged with said first and second brake rods, for fixing the position of said first brake rods relative to each other; second means operably attached to said lower end of said second brake rod for operably engaging said brake pedal of said automobile; a throttle rod anchor bracket fixedly attached to said first brake rod adjacent to said handle; said throttle rod anchor bracket further comprising a flange extending outwardly from said first brake rod defining an aperture; a first throttle rod having upper and lower ends which is slidingly engaged with the aperture of the flange of said throttle rod anchor bracket; a second handle having a flat surface thereon for operable engagement with the thumb of the user fixedly attached to said upper end of said first throttle rod; a second throttle rod telescopingly engaged with said lower end of said first throttle rod; third means operably engaged with said first and second throttle rods for fixing the position of said throttle rods relative to each other; and forth means operably engaged to said lower end of said second throttle rod for operably engaging said throttle pedal of said automobile.

The user of applicant's apparatus while sitting in the driver seat of a conventional automobile adjusts the length of the first and second brake rods, such that, the second means operably engages the brake pedal of said automobile at a length which places the first handle comfortably in the hand of the user. Then, the user adjusts the length of the first and second throttle rods such that they operable engage the throttle pedal at a length which allows the thumb of the user to comfortably operate the second handle. Thus, the user of applicant's apparatus is able to operate both the throttle and brake pedals of a conventional automobile with the use of one hand and applicant's apparatus.

Additionally, objects of applicant's invention are that it is easily transferable, removable and transportable.

DETAILED DESCRIPTION OF PREFERRED EMBODIMENTS

Figure 1:
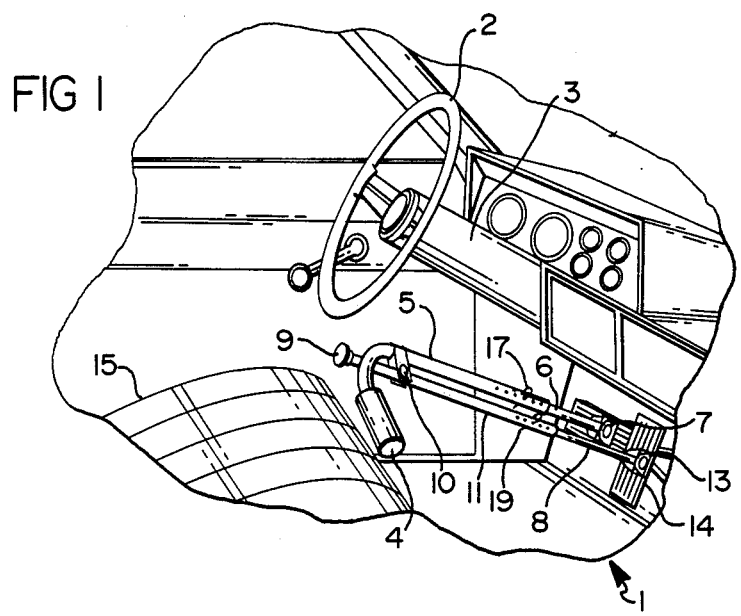
FIG. 1 depicts applicant's invention in use in a cut away portion of an automobile.

FIG. 1 illustrates how invention 1 will be used and oriented in a conventional automobile. However, FIG. 1 only reveals a cut away portion of an automobile revealing basically the essential elements of a steering wheel 2, a steering column 3, a drivers seat 15, a brake pedal 8, and a throttle pedal 14. Otherwise, FIG. 1 reveals the essential elements of invention 1 which include a handle 4, attached to a first brake control rod 5 which is substantially straight which is telescopingly engaged with a second brake control rod 6. Relative positioning of first brake control rod 5 to second brake control rod 6 is fixed by first spring clip 17. The lower end of second brake control rod 6 has attached to it first bracket 7 for operably engaging brake pedal 8. As can be seen first brake control rod 5 in close proximity to where it is attached to handle 4 has throttle rod anchor bracket 10 attached thereto. Throttle rod anchor bracket 10 is provided with an aperature which slidingly engages, i.e., allows first throttle control rod 11 to pass through it. First throttle rod control 11 is telescopingly engaged with second throttle control rod 12 their relative position being fixed by second spring hook 19. Additionally, second throttle control rod 12 has attached to its lower end second bracket 13 which operably engages throttle pedal 14. It should be noted that first throttle control rod 11 has at its upper end a thumb control handle 9. As can be seen throttle rod anchor bracket 10 holds first brake control rod 5 and first throttle control rod 11 in close proximity to one and another, thereby allowing the user, unseen, of the invention 1 to grasp handle 4 with one hand and operate first throttle control rod 11 with the thumb of the same hand. Thus, by the user applying pressure to handle 4 the automobile may be braked and because first throttle control rod 11 slidingly engages the aperture of the throttle rod anchor bracket 10 the pressure exerted on handle 4 by the user will not effect the throttle pedal 14. Also, the user may obviously operate throttle pedal 14 by simply controlling the amount of pressure his thumb applies to thumb handle 9.

Figure 2:
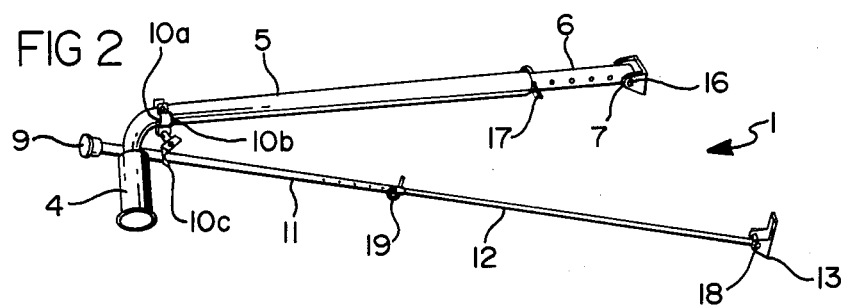
FIG. 2 is a plan view of applicant's apparatus depicting one species of applicant's invention, with respect to the means employed to engage the throttle and brake pedals, 14 and 8 respectively.

FIG. 2 shows substantially the invention 1 of FIG. 1. However, FIG. 2 does reveal several minor changes which cause the invention 1 of FIG. 2 to constitute separate species from that of FIG. 1. These changes consist of the throttle rod anchor bracket 10a which is constructed from several small clamps 10b and 10c, but which otherwise substantially function the same as throttle rod anchor bracket 10 of FIG. 1. Additionally, species of invention 1 in FIG. 2 does not employ the first ball joint and clip bracket 7 and second ball joint and clip bracket 13 of FIG. 1, but instead while still employing the same type of bracket as the invention 1 of FIG. 1 employs the first pin 16 and second pin 18 to provide pivotal movement of the brackets 7 and 13.

Figures 3, 4:
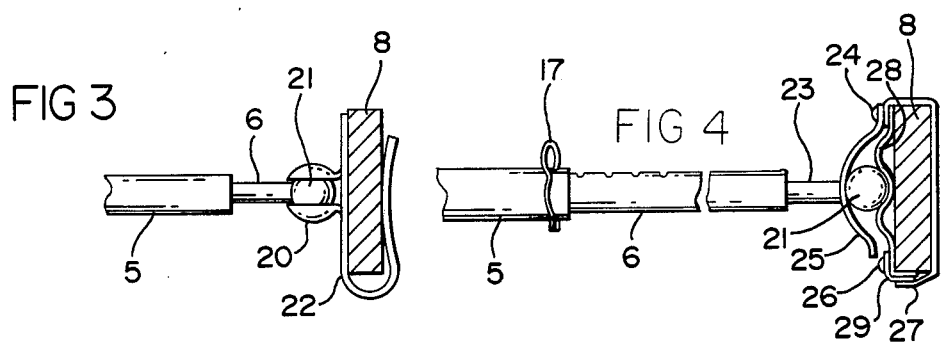
FIG. 3 discloses a second species of applicant's invention which uses a ball joint and clip for engaging the brake pedal 8, but which can also be used on the throttle pedal 14, not depicted in this figure.
FIG. 4 discloses yet a third species of applicant's invention employing a second type of ball joint relative to FIG. 3 and a strip of self-adhesive material for connecting onto itself for securing the ball joint onto a pedal 8 or 14.

FIG. 3 discloses a particular type of ball joint 20 which holds a ball 21 which is intergrally attached to, for example, second brake control rod 6 which is telescopingly engaged with first brake control rod 5. Additionally, ball joint 20 is intergrally attached to a pedal clip 22 which for illustrative purposes is clipped onto brake pedal 8.

FIG. 4 further discloses yet another arrangement for pivoting either second brake control rod 6 or second throttle control rod 12, but which in this case for illustrative purposes only shows second brake control rod 6. Furthermore, this figure discloses a strip of adhesive material 27 which wraps partially around brake pedal 8, for illustrative purposes, and is held at one end by a rivet-like connector 24. Adhesive material 27 holds ball clamp 25 to brake pedal 8 by adhering to second strip of adhesive material 29. Additionally, this figure discloses a third rod extension 23, a ball clamp 25 and a retainer clamp 28. Another rivet-like connector 26 secures the other side of retainer plate 28 and one end of second strip of adhesive material 29.

It is to be understood that the scope of applicant's invention shall not be limited to that specified above. Further, understanding of the scope of applicant's invention will be gained when the aforegoing specification is constructed in light of the claims.

I claim:

1. An apparatus by which the user may operate with one hand the throttle and brake pedal of a conventional automobile, said apparatus is easily transported, transfered and adaptable from one vehicle to another, requires no modification of the automobile, is operable from the conventional driver's seat, and extends out from the throttle and brake pedals to about the end of the driver's seat beneath the steering column, comprising, in combination:

(a) a handle;
(b) a first brake rod having upper and lower ends having said handle fixedly attached to the upper end;
(c) a second brake rod having upper and lower ends telescopingly engaged with said lower end of said first brake rod;
(d) first means, operably engaged with said first and second brake rods, for fixing the position of said first brake and second brake rods relative to each other;
(e) second means, operably attached to said lower end of said second brake rod, for operable engagement with said brake pedal of said automobile;
(f) a throttle rod anchor bracket fixedly attached to said first brake rod adjacent to said handle;
(g) a first throttle rod having upper and lower ends which are operably and slidingly engaged with said throttle rod anchor bracket;
(h) a second handle having a flat surface thereon for operable engagement with the thumb of the user fixedly attached to said upper end of said first throttle control rod;
(i) a second throttle rod telescopingly engaged with said lower inner end of said first throttle rod;
(j) third means, operably engaged with said first and second throttle rod, for fixing the position of said throttle rods relative to each other;
(k) forth means, operably attached to said lower end of said second throttle rod, for operable engagement with said throttle pedal of said automobile;
(l) said first and second brake rods have provided therein a plurality of transverse apertures;
(m) said first and second throttle rods have provided therein a plurality of transverse apertures;
(n) said first means includes a spring clip for traversing an aperture in each of said first and second brake rods at the same time;
(o) said second means further includes a movable bracket attached to said lower end of said brake rod;

(p) said movable bracket is of a configuration for bringing into contact with the top surface of the brake pedal;
(q) said second means further includes pin-like means for movably attaching said lower end of said second brake rod to said movable brakcet;
(r) said first and second throttle rods have provided therein a plurality of transverse apertures which may be aligned in pre-determined positions;
(s) said second means include a ball;
(t) a ball joint for receiving said ball; and
(u) a clip for attaching said second means to said brake pedal.

2. An apparatus by which the user may operate with one hand the throttle and brake pedal of a conventional automobile, said apparatus is easily transported, transferred and adaptable from one vehicle to another, requires no modification of the automobile, is operable from the conventional driver's seat, and extends out from the throttle and brake pedals to about the edge of the driver's seat beneath the steering column, comprising, in combination:
(a) a handle;
(b) a first brake rod having upper and lower ends having said handle fixedly attached to the upper end;
(c) a second brake rod having upper and lower ends telescopingly engaged with said lower end of said first brake rod;
(d) first means, operably engaged with said first and second brake rods, for fixing the position of said first and second brake rods relative to each other;
(e) second means operably attached to said lower end of said second brake rod, for operable engagement with said brake pedal of said automobile;
(f) a throttle rod anchor bracket fixedly attached to said first brake rod adjacent to said handle;
(g) a first throttle rod having upper and lower ends which are operably and slidably engaged with said throttle rod anchor bracket;
(h) a second handle having a flat surface thereon for operable engagement with the thumb of the user fixedly attached to said upper end of said first throttle rod;
(i) a second throttle rod telescopingly engaged with said lower inner end of said first throttle rod;
(j) third means, opeabley engaged with said first and second throttle rods, for fixing the position of said throttle rods relative to each other;
(k) forth means, operably attached to said lower end of said second throttle rod, for operable engagement with said throttle pedal of said automobile;
(l) said first and second brake rods have provided therein a plurality of transverse apertures;
(m) said first and second throttle rods have provided therein a plurality of transverse apertures;
(n) said first means includes a spring clip for traversing an aperture in each of said first and second brake rods at the same time;
(o) said second means further includes a movable bracket attached to said lower end of said brake rod;
(p) said movable bracket is of a configuration for bringing into contact with the top surface of the brake pedal;
(q) said means includes a ball;
(r) a ball clamp for holding said ball;
(s) a retainer plate which said ball moves against and which is located on the opposing side of said ball relative to the position of said ball clamp;
(t) said retainer plate is configured with a valleylike center portion in which said ball moves in and against;
(u) at least two rivet-like attaching means operably engaged with said ball clamp and said retainer plate;
(v) a first strip of adhesive material having one end held in place by one of said rivet-like attaching means;
(w) a second strip of adhesive material having one end held in place by one of said rivet-like attaching means which is not engaged with said first strip of adhesive material; and
(x) the free end of said first strip of adhesive material is wrapped around said brake pedal until it adheres to the free end of said second strip of adhesive material.

3. The apparatus of claim 2, wherein:
(a) said third means includes a spring clip having a straight portion for traversing the apertures in said first and second throttle rods; and
(b) said third means is further defined by a rounded section which tightly wraps around the exterior of said first throttle rod when said straight portion is traversing the aligned apertures of said first and second throttle rods.

4. The apparatus of claim 3, wherein:
(a) said forth means includes a second bracket movably attached to said lower end of said second throttle rod and
(b) said movable second bracket is of a configuration having at least one substantially flat surface for bringing into contact with the top surface of the throttle pedal.

5. The apparatus of claim 4, wherein:
(a) said forth means further includes second pin-like means for movably attaching said lower end of said second throttle rod to said second movable bracket.

6. The apparatus of claim 3, wherein:
(a) said forth means includes a second ball;
(b) a second ball joint for receiving said second ball; and
(c) a second clip for attaching said forth means to said throttle pedal.

7. The aparatus of claim 3, wherein:
(a) said forth means includes a second ball;
(b) a second ball clamp for holding said second ball;
(c) a second retainer plate which said second ball moves in and against which is located on the opposing side of said second ball relative to the position of said second ball clamp;
(d) said second retainer plate is further configured with a valley-like center portion in which said second ball moves in and against;
(e) said second retainer plate is provided with at least two apertures in pre-determined positions;
(f) at least two second rivet-like attaching means which run from said second ball clamp to said second retainer plate;
(g) a third strip of adhesive material having one end held in place by one of said second rivet-like attaching means;
(h) a forth strip of adhesive material having one end held in place by one of said second rivet-like attaching means which is not engaged with said first strip of adhesive material; and
(i) the free end of said third strip of adhesive material is wrapped around said throttle pedal until it adheres to the free end of said forth strip of adhesive material.

* * * * *